(12) United States Patent
Vig

(10) Patent No.: US 6,262,988 B1
(45) Date of Patent: *Jul. 17, 2001

(54) METHOD AND SYSTEM FOR SUBNETTING IN A SWITCHED IP NETWORK

(75) Inventor: Deepak Vig, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/569,682

(22) Filed: May 12, 2000

Related U.S. Application Data

(63) Continuation of application No. 09/038,872, filed on Mar. 11, 1998, now Pat. No. 6,115,385.

(51) Int. Cl.[7] ................................................. H04L 12/56
(52) U.S. Cl. ............................................ 370/401; 370/469
(58) Field of Search ................................... 370/401, 469, 370/400, 402, 390, 432

(56) References Cited

U.S. PATENT DOCUMENTS

| | | | |
|---|---|---|---|
| 4,821,265 | 4/1989 | Albal et al. | 370/110.1 |
| 4,864,559 | 9/1989 | Perlman | 370/60 |
| 4,893,302 | 1/1990 | Hemmady et al. | 370/60 |
| 4,933,937 | 6/1990 | Konishi | 370/85.13 |
| 4,942,518 | 7/1990 | Weatherford et al. | 364/200 |
| 5,018,137 | 5/1991 | Backes et al. | 370/85.13 |
| 5,027,350 | 6/1991 | Marshall | 370/85.13 |
| 5,088,032 | 2/1992 | Bosack | 395/200 |
| 5,138,615 | 8/1992 | Lamport et al. | 370/94.3 |
| 5,140,585 | 8/1992 | Tomikawa | 370/60.1 |
| 5,157,774 | 10/1992 | Culley | 395/425 |
| 5,210,850 | 5/1993 | Kelly et al. | 395/425 |
| 5,247,639 | 9/1993 | Yamahata | 395/425 |
| 5,247,642 | 9/1993 | Kadlec et al. | 395/425 |
| 5,247,648 | 9/1993 | Watkins et al. | 395/425 |
| 5,257,359 | 10/1993 | Blasco et al. | 395/425 |
| 5,274,631 | 12/1993 | Bhardwaj | 370/60 |
| 5,304,992 | 4/1994 | Harashima | 34/825.52 |
| 5,305,311 | 4/1994 | Lyles | 370/60 |
| 5,313,454 | 5/1994 | Bustini et al. | 370/13 |
| 5,327,545 | 7/1994 | Begun et al. | 395/425 |
| 5,361,256 | 11/1994 | Doeringer et al. | 370/60 |
| 5,394,394 | 2/1995 | Crowther et al. | 370/60 |
| 5,394,402 | 2/1995 | Ross | 370/94.1 |
| 5,414,704 | 5/1995 | Spinney | 370/60 |
| 5,418,779 | 5/1995 | Yemini et al. | 370/54 |
| 5,420,862 | 5/1995 | Perlman | 370/85.13 |
| 5,430,715 | 7/1995 | Corbalis et al. | 370/54 |
| 5,473,607 | 12/1995 | Hausman et al. | 370/85.13 |
| 5,500,860 | 3/1996 | Perlman et al. | 370/85.13 |
| 5,511,168 | 4/1996 | Perlman et al. | 370/200.15 |
| 5,548,585 | 8/1996 | Lagoutte et al. | 370/60 |
| 5,586,296 | 12/1996 | Bernstein et al. | 395/465 |
| 5,612,959 | 3/1997 | Takase et al. | 370/390 |
| 5,617,421 | 4/1997 | Chin et al. | 370/402 |
| 5,623,627 | 4/1997 | Witt | 395/499 |
| 5,625,793 | 4/1997 | Mirza | 395/465 |

(List continued on next page.)

Primary Examiner—Douglas Olms
Assistant Examiner—Ken Vanderpuye
(74) Attorney, Agent, or Firm—Cesari and McKenna, LLP

(57) ABSTRACT

A large flat IP network is created in a switched layer-2 network by adjusting the subnet masks of hosts such that these hosts can communicate directly with other hosts without the use of an intermediate router. The layer-2 switches are configured with user-selected IP subnets and monitor and analyze multicast packets to learn the mapping between IP subnets and switch ports. The layer-2 switches selectively forward the mulitcast packets based on the learned mappings between IP subnets and ports. After the destination host responds to the forwarded multicast, a direct connection is established between the source and destination hosts using the media access control addresses of both hosts.

20 Claims, 10 Drawing Sheets

U.S. PATENT DOCUMENTS

| | | | |
|---|---|---|---|
| 5,633,858 | 5/1997 | Chang et al. | 370/255 |
| 5,633,869 | 5/1997 | Burnett et al. | 370/396 |
| 5,636,216 | 6/1997 | Fox et al. | 370/402 |
| 5,673,263 | 9/1997 | Basso et al. | 370/396 |
| 5,684,800 | 11/1997 | Dobbins et al. | 370/401 |
| 5,740,171 | 4/1998 | Mazzola et al. | 370/392 |
| 5,742,604 | 4/1998 | Edsall et al. | 370/401 |
| 5,752,003 | 5/1998 | Hart | 395/500 |
| 5,752,274 | 5/1998 | Garibay, Jr. et al. | 711/206 |
| 5,754,547 | 5/1998 | Nakazawa | 370/401 |
| 5,764,636 | 6/1998 | Edsall | 370/401 |
| 5,778,422 | 7/1998 | Genduso et al. | 711/117 |
| 5,796,732 | 8/1998 | Mazzola et al. | 370/362 |
| 5,796,740 | 8/1998 | Perlman et al. | 370/401 |
| 5,829,027 | 10/1998 | Goodrum | 711/122 |
| 5,835,720 | 11/1998 | Nelson et al. | 395/200.54 |
| 5,854,901 | 12/1998 | Cole et al. | 395/200.75 |
| 5,875,464 | 2/1999 | Kirk | 711/129 |
| 5,890,216 | 3/1999 | Derrick et al. | 711/138 |
| 5,901,286 | 5/1999 | Danknick et al. | 395/200.33 |
| 5,906,001 | 5/1999 | Wu et al. | 711/154 |
| 5,910,955 | 6/1999 | Nishimura et al. | 370/401 |
| 5,968,126 | 10/1999 | Ekstrom et al. | 709/225 |
| 5,982,773 | 11/1999 | Nishimura et al. | 370/395 |
| 5,999,536 | 12/1999 | Kawafuji et al. | 370/401 |
| 6,055,236 | 4/2000 | Nessett et al. | 370/389 |
| 6,115,385 * | 8/2000 | Vig | 370/401 |

* cited by examiner

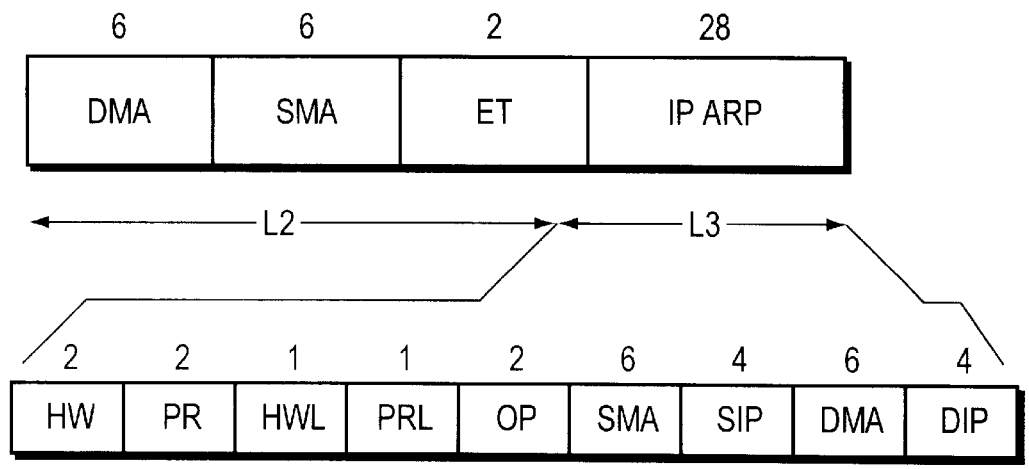

L2 = LAYER 2 HEADER

DMA = DESTINATION MAC ADDRESS
    SMA = SOURCE MAC ADDRESS
    ET   = ETHERTYPE
           X0806 ARP

L3 = LAYER 3 HEADER

HW  = HARDWARE TYPE
            X0001 ETHERNET
    PR   = PROTOCOL
            0800 IP
    HWL = HARDWARE ADDRESS LENGTH I.E. LENGTH OF LAYER-2 ADDRESS
            06 FOR ETHERNET
    PRL = PROTOCOL ADDRESS LENGTH I.E. LENGTH OF LAYER-3 ADDRESS
            04 FOR IP
    OP   = OPERATION
    SMA = SOURCE OF MAC ADDRESS
    SIP  = SOURCE OF IP ADDRESS
    DMA = DESTINATION MAC ADDRESS
    DIP  = DESTINATION IP ADDRESS

FIG. 7

METHOD AND SYSTEM FOR SUBNETTING IN A SWITCHED IP NETWORK

CROSS-REFERENCE TO RELATED APPLICATION

This is a continuation of application Ser. No. 09/038,872 filed Mar. 11, 1998 now U.S. Pat No. 6,115,385. The entirety of the disclosure of said copending application is hereby incorporated herein by reference.

BACKGROUND OF THE INVENTION

The present invention relates in general to computer communication networks, and in particular, to systems and methods for transforming an existing router-based network to a switch-based network.

Current internet-based networks are built on TCP/IP (Transmission Control Protocol/Internet Protocol) and related standards. TCP provides application services but the network infrastructure is implemented with the IP portion of TCP/IP. Some of the more notable features of the Internet protocols are that they:

a. can be implemented on many different underlying hardware technologies from different vendors;
b. hide the underlying hardware;
c. allow autonomous networks to be built and managed independently;
d. allow autonomous networks to be easily interconnected with routers to build larger networks which can be further interconnected to build very large networks like the global Internet;
e. are open standards.

The flexibility, scalability and openness of the Internet protocols has led to their widespread use even inside private networks, which are commonly known as Intranets. The IP protocol essentially overlays the interconnected networks which are implemented with different hardware technologies over widespread geographic distances and make it all look like a single homogenous network.

Most organizations design, implement and manage their own autonomous IP networks or Intranets and connect them using routers to other networks or to the global Internet. Large organizations generally further divide their IP network into subnetworks using subnet technology for distributed administration and traffic control. Again routers are used to interconnect these subnetworks.

Most networks on customer premises are built with IEEE 802 Local Area Network (LAN) hardware technologies (e.g., 10 Mbps Ethernet and 16 Mbps token-ring). These are generally referred to as layer-1/2 technologies. Layer-1 refers to the wiring and signalling characteristics of the network and layer-2 refers to the data link protocols, also called Media Access Control (MAC) and Logical Link Control (LLC) protocols. Normally, each LAN is defined as a separate IP subnetwork and then interconnected using routers.

Geographically distributed LANs are normally interconnected with routers containing a LAN connection and a wide area network (WAN) connection. Examples of WAN connections are leased lines, frame-relay and satellite links. The LANs and WANs are then overlayed with a layer-3 protocol like IP. The IP protocol hides the underlying physical networks and gives a single homogenous logical view of the entire network to the attached hosts.

Recently, LANs have undergone a dramatic transformation due to the introduction of layer-2 switches for LANs (also known as LAN switches). Shared media LAN hubs like 10 Mbps Ethernet and 16 Mbps token-ring are being replaced by Ethernet and token-ring switches. Switches are fast, inexpensive and can provide full and dedicated bandwidth to each attached user. For example, a single 10 Mbps Ethernet hub being shared by 20 users can now become a 200 Mbps switched network (10 Mbps×20 ports). Some switches even allow attached hosts to transmit and receive simultaneously at full LAN speed which effectively doubles the throughput on each switch port, for example, each Ethernet switch port could be 20 Mbps in full duplex mode.

To build a larger switched network, users can connect LAN switches to higher speed backbone switches using high speed interfaces like Fast Ethernet (100 Mbps) or ATM (155 or 622 Mbps). Even with this high speed switched network, routers are still needed to route packets between the logical IP subnetworks. Routers are therefore still being used to route between subnets that are implemented on switches instead of LAN hubs.

The switching phenomenon has tremendously increased much needed network capacity. While traditional routers could easily handle 10 Mbps of traffic coming out of LAN hubs, they cannot handle the hundreds of Mbps of traffic that switches can generate. One partial solution to this problem involves connecting routers to switches with high speed interfaces (e.g. 155 Mbps). But the internal routing capacity of the router must also be increased to forward the high volume of traffic coming in to the router. This is very expensive. Moreover, unlike switches, routers still introduce significant latency during data transfer. Another similar solution is to remove the router from the network and embed it inside switches. This might reduce the cost of the router and hide it from the user, but it still suffers from the same throughput and latency limitations as the previous solution. Yet another solution is to create a flat network, i.e., single IP subnet or IP network. This will let hosts communicate with each other without an intermediate router. However, this defeats the original reasons for subnetting. In this scenario, broadcast floods which are common on LANs, but are normally contained within an IP subnet, will be propagated all over a large switched network and seriously degrade network performance.

In the era of high-speed switching, routers have become a bottleneck in networks. When compared to switches, routers are slow, expensive, difficult to administer and restrict host mobility between IP networks. But they are still needed to interconnect layer-3 IP networks and IP subnets. Thus there is a need for a system and method that enables network administrators and end users to get the benefits of high-speed switching and the benefits of IP subnetting without the use of routers. This invention specifically solves the problem of creating subnets in a switched network without IP routers; separating subnet broadcast traffic but allowing hosts on different subnetworks to communicate directly at full switching speed without involving a router. Furthermore, the invention greatly simplifies the subnetting of an IP network by allowing centralized control of subnets.

SUMMARY OF THE INVENTION

It is therefore an object of the present invention to provide an improved data communication and networking system.

It is another object of the present invention to provide a method for distributing IP network layer routing functions to a switch device.

It is a further object of the present invention to provide a method that enables host devices on different subnetworks to communicate at full switching speed without the use of router devices.

It is a still further object of the present invention to provide a method that enables centralized control of subnets in an IP network.

The foregoing objects are achieved by the system and method of the present invention in which hosts (end stations) are moved from router-attached legacy LANs to a switched network composed of interconnected layer-2 switches. A large IP subnetwork is established by setting the subnet mask on the IP hosts in the switched network to a smaller value. Enlarging the IP subnetwork enables all hosts to communicate directly with each other without an intermediate router. Subnets are then implemented in the switches within the IP subnetwork, effectively moving subnet control from the hosts to the centrally controlled switches. The switch CPU learns subnet information by analyzing layer-2 multicast packets, specifically the layer-3 header to determine if the packet is an IP ARP request packet. The switch builds a subnet to port mapping table based on packets received from each source host and selectively forwards the multicast packet to all ports on which the destination subnet is active. Once the destination host responds to the IP ARP request, a direct communication path is established in the switch between the port on which the source host is attached and the port on which the destination host is attached.

BRIEF DESCRIPTION OF THE DRAWINGS

The novel features believed characteristic of the present invention are set forth in the appended claims. The invention itself, however, as well as a preferred mode of use, further objects and advantages thereof, will be best understood by reference to the following detailed description of an illustrative embodiment when read in conjunction with the accompanying drawings, wherein:

FIG. 7 illustrates the prior art format of an IP ARP packet for an Ethernet frame in DIX format;

DETAILED DESCRIPTION OF THE PREFERRED EMBODIMENT

Before proceeding to a description of the present invention, a brief discussion of IP addressing and subnetting as presently used in router-based networks will establish the framework for the inventive concepts that follow.

Figure 1:
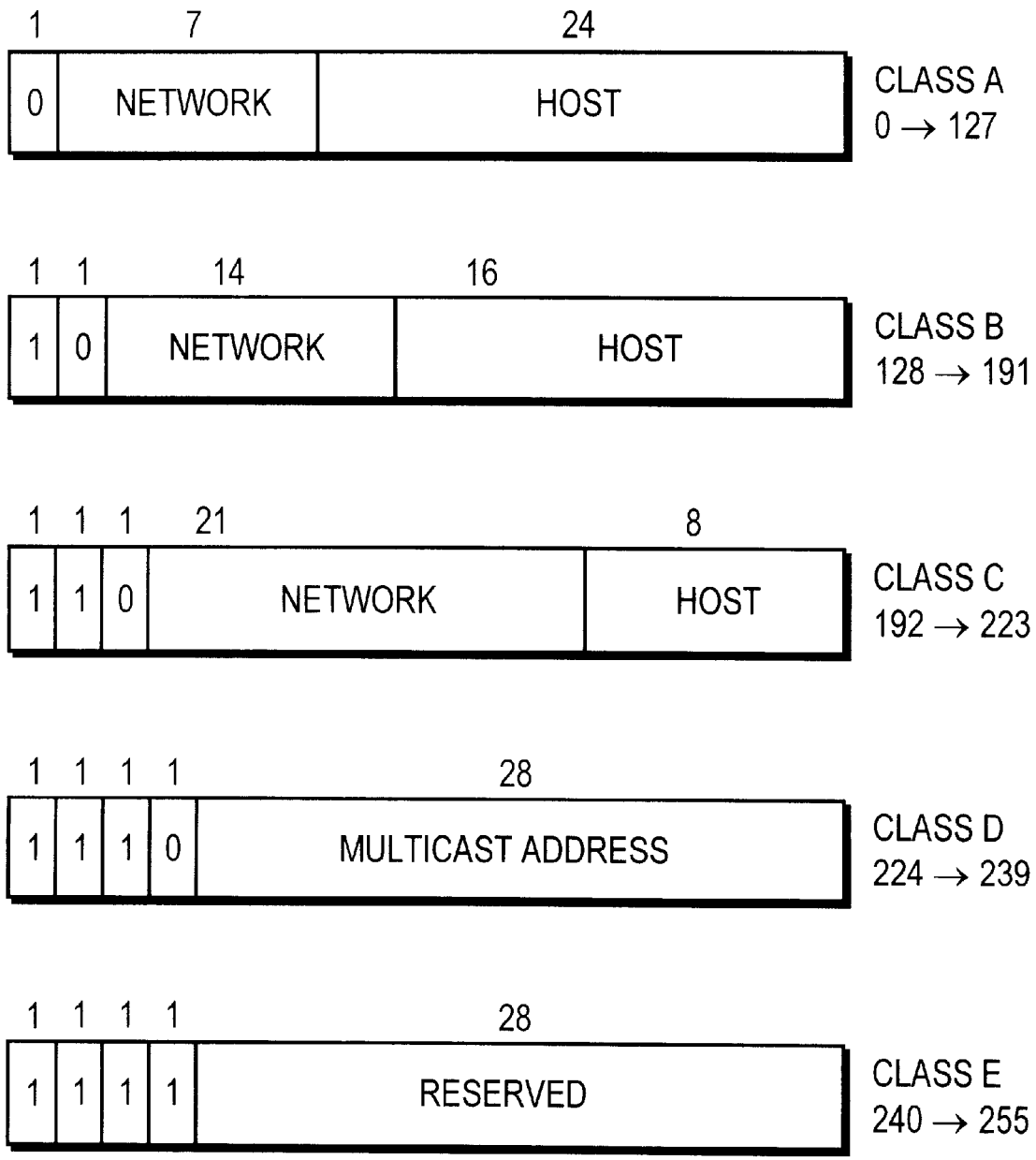
FIG. 1 illustrates the format of the five different classes of Internet Protocol addresses (IP version 4)

In an IP network, every host attached to the network must have a unique IP address. In the current version of the IP protocol, the IP address is 4 bytes long and is generally written in "dotted decimal" notation where each decimal number represents a byte in the address. For example, a host could have an address like 128.0.1.1. Addresses can range from 0.0.0.0. to 255.255.255.255. Furthermore, the IP address range is partitioned into five classes and, within the first three classes, the IP address is partitioned into a network identifier and a host identifier as illustrated in FIG. 1. The bit pattern on the left dictates the length of the network identifier in the IP address and is considered to be part of the network identifier. As shown, the IP address range is divided into different classes ranging from class A to class E. Each class has a different size network identifier. Class A addresses consist of an 8 bit network number, followed by a 24 bit host number. Class B addresses consist of a 16 bit network number, followed by a 16 bit host number. Class C addresses consist of a 24 bit network number and an 8 bit host number. Note that class D addresses are used for special purposes and class E addresses are reserved for future use. Therefore IP hosts on a network have addresses that are of class A, B or C. The class of an address can be determined by examining the first number of the address. For example, IP address 129.4.1.3 is a class B address because the first number is in the range 128–191 (128 in binary is 10 000000 and 191 is 10 111111). Therefore, IP address 129.4.1.3 has a 2 byte network identifier 129.4 and a 2 byte host identifier 1.3. Similarly IP address 197.3.2.9 is a class C address whose network identifer is 197.3.2 and whose host identifier is 9.

The number of bits that determine the network identifier of an IP address is called the natural (or default) mask of the address. Thus the natural mask of any class B IP address is 16 bits long, i.e., the first 16 bits determine the network identifier of the address. Default subnet masks for class A, class B and class C are 255.0.0.0, 255.255.0.0, and 255.255.255.0, respectively.

Subnetting of an IP network can be done for a number of reasons, for example, use of different physical media, preservation of the address space, control of network traffic and security. The most common reason is to control network traffic since network performance can be adversely affected under heavy loads. A router is used to connect IP networks to minimize the traffic each network segment must receive. Applying a subnet mask to an IP address identifies the network and host parts of the address.

Users normally get a block of IP addresses of a certain class and then further divide the host identifier into an internal subnetwork number and a host identifier. For example, a class B address range like 128.1.1.1 to 128.1.50.255 has an IP network identifier of 128.1, a 16 bit natural mask and a host identifier range from 1.1 to 50.255. The user can divide the 16 bit host identifer into an eight bit subnetwork identifier and an eight bit host identifier. Therefore the third byte in the address could represent the subnetwork identifier, which is this case would be between 1 and 50 and each subnetwork can have host identifiers in the range of 1–255. The number of bits used to represent the internal subnetwork is left to the user of the address range. Normally, this decision is based on the number of subnets needed (eg. 16 subnets could be represented with 4 bits). The rules for using IP subnetworking are explained in IETF RFC 950 which is incorporated herein by reference. This RFC states that each IP host on the network be made aware of the subnet by using a subnet mask that is longer than the natural mask of the IP address. For example, a class B address that is to be subnetted into an eight bit subnetwork identifier and an eight bit host identifier, will have a 24 bit subnet mask. This is determined by adding the length of the natural mask (16 bits in this case) to the length of the subnetwork id (8 bits in this case).

When an IP network is partitioned into subnetworks, each host in the network uses the subnetwork mask to check for its subnetwork identifier. When host-1 wants to communicate with host-2, it compares its own subnet identifier with the subnet identifier of host-2. The subnet identifier is derived by logically ANDing the IP address with the subnet mask. If the destination host-2 is in a different subnet from the source host-1, then the source host will use a router to communicate with destination host-2. If both hosts are in the same subnet, then host-1 will attempt to communicate directly with host-2. If the subnet mask is 0, then the source host will simply compare the natural IP network and follow the same process for communication with another host.

Almost every host and router supports static subnetting. In static subnetting, the subnet mask remains constant throughout the network. Hosts will generally store the subnet mask to be used in a configuration file.

The present invention is described in the context of the steps required to transform an existing router-based IP network to a switch-based IP network. These steps are used to explain the key concepts of the invention and are not intended to be a step-by-step guide to migrating any current router-based network. The steps include the following:

1. moving hosts from router-attached legacy LANs to a switched network made up of interconnected layer-2 switches;
2. creating a large, flat IP network or IP subnet on the switched layer-2 network;
3. implementing subnets in the switches that are contained within the IP network or IP subnet.

Moving hosts from router-attached legacy LANs to a switched network made up of interconnected layer-2 switches means replacing LAN hubs with LAN switches to get high throughput. Enterprises are already replacing LAN hubs with LAN switches but are having to live with router bottlenecks. It is not necessary to have a fully switched network to benefit from this invention. By connecting their existing hubs to a switch, users still can benefit from this invention even with a partially switched network. ATM switches can be used instead of LAN switches. Layer-2 LANs can be emulated on ATM using LAN Emulation Services. The LAN Emulation Service used must be capable of switching between emulated LANs just like LAN switches do between real LANs.

With this invention, routers are no longer needed to forward traffic between subnets in a switched network. However, routers still might be needed to connect dissimilar LANs together. For example, if part of the network is token-ring and part of it is Ethernet, then a router might be used to forward data between token-ring and Ethernet hosts since most LAN switches available today cannot switch between dissimilar networks. Routers also should be used when connecting geographically dispersed networks over a wide area network (WAN), unless a LAN to WAN switch is available. Another use of routers might be for security purposes, where part of a network needs to be isolated or certain types of application traffic need to be controlled. However, in most cases users would prefer wire speed, switched connections between end hosts without any intermediate routers.

Creating a large, flat IP network or IP subnet on the switched layer-2 network simply means setting the subnet mask on the IP hosts in the switched network to a smaller value. The subnet mask could even be set to 0, in which case IP subnetting is disabled and the hosts will use the natural IP network number.

Figure 2:
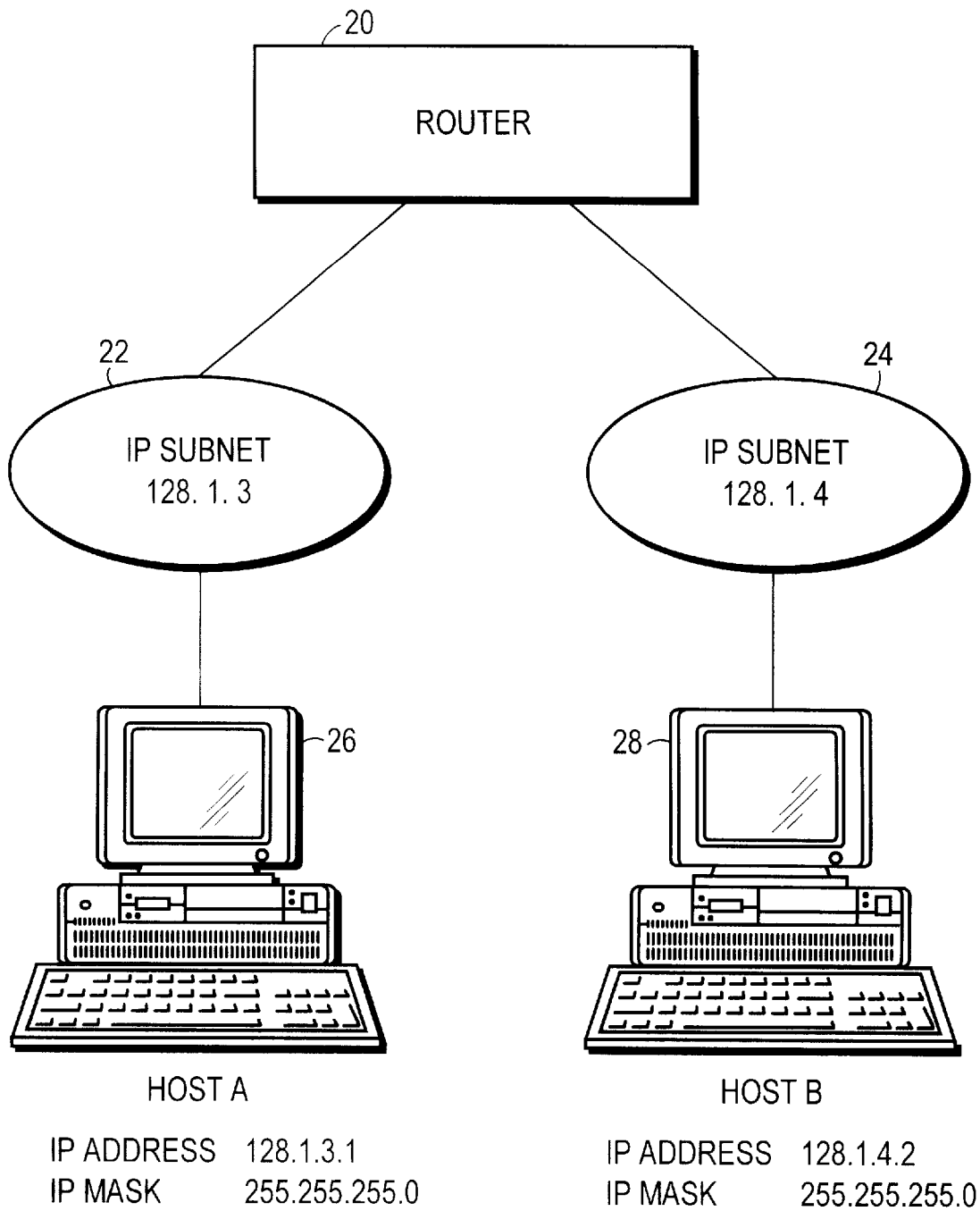
FIG. 2 illustrates a prior art example of routing IP traffic between IP subnets.
Figure 3:
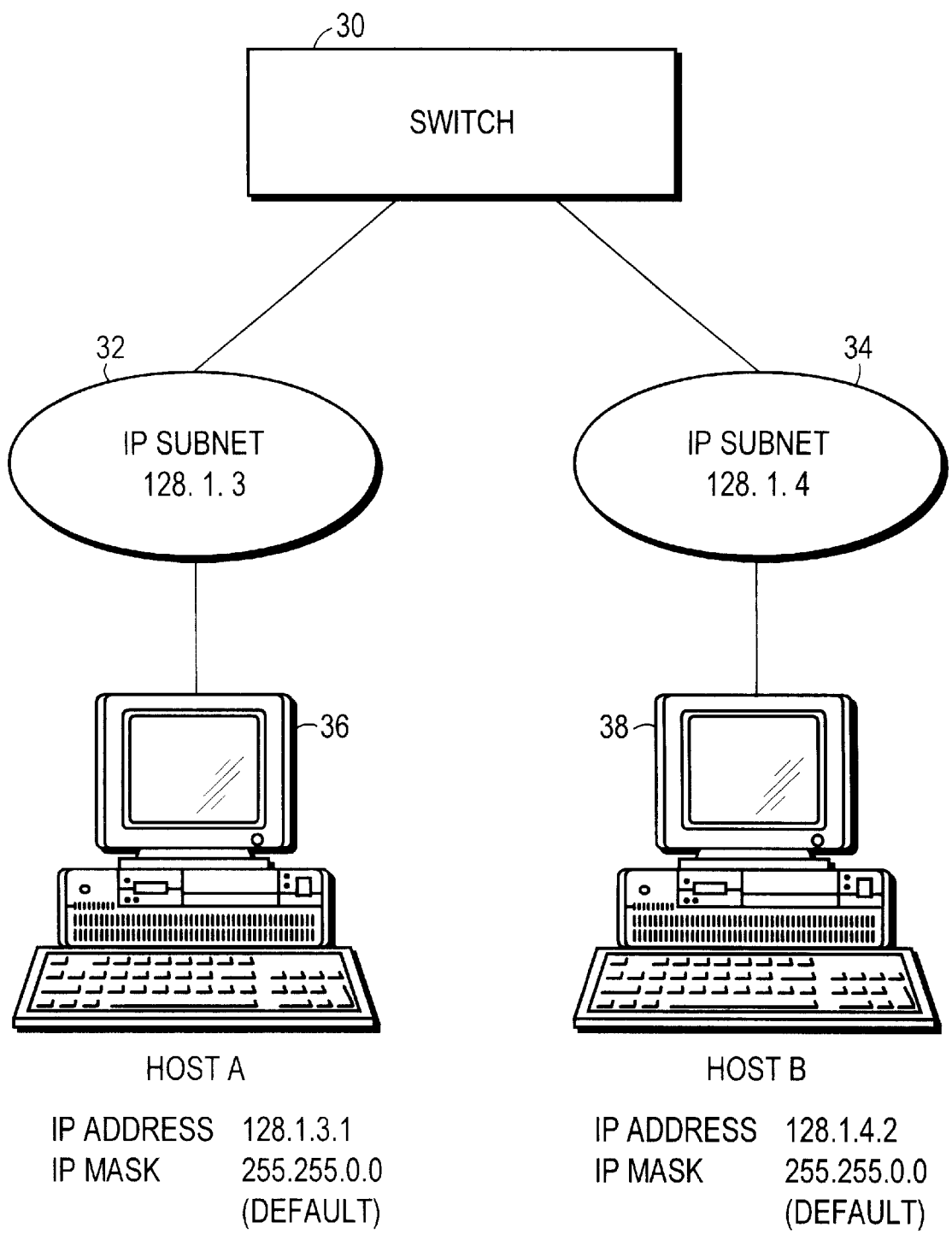
FIG. 3 illustrates an example of switching IP traffic between subnets.

The IP subnet is enlarged, or subnetting disabled, so that all hosts are in the same IP network or IP subnet and therefore communicate directly with each other without using an intermediate router. FIG. 2 shows an example of an IP network where each host has a subnet mask defined. There are two subnets depicted in FIG. 2, i.e. IP subnet 128.1.3 and IP subnet 128.1.4. These are designated by reference numerals 22 and 24, respectively. The IP subnets 22, 24 are interconnected by router 20. Host A 26 is attached to IP subnet 22; host B is attached to IP subnet 24. Host 26 has an IP address 128.1.3.1 and an IP mask 255.255.255.0. Host 28 has an IP address 128.1.4.2 and an IP mask 255.255.255.0. FIG. 3 shows an example of an IP network where each host has a subnet mask set to 0. In this figure, the router has been replaced by switch 30. Two pseudo subnets 128.1.3 (reference numeral 32) and 128.1.4 (reference numeral 34) are defined. Host A 36 is attached to pseudo subnet 32; host B 38 is attached to pseudo subnet 34. Host 36 has an IP address 128.1.3.1 and an IP mask 255.255.0.0 which is the default or natural mask for a class B IP address. Similarly, host 38 has an IP address 128.1.4.2 and IP mask 255.255.0.0 which is the default mask.

Any changes to end stations usually present significant problems for network administrators. This can be solved by leaving the legacy routers attached to the network. This will allow hosts that have changed their mask to use the fast switched path while others can continue using the slow router path.

Implementing subnets in the switches that are contained within the IP network or IP subnet is the heart of the invention. It is based on the idea that subnets can be implemented within layer-2 switches. This effectively moves subnetting control from the end hosts on the network to the centrally controlled switches.

A layer-2 switch can do special processing of selected packets that are passing through the switch. Normally, layer-2 switches are designed with specialized hardware that can decode layer 2 headers in packets. Generally this is the MAC address in the layer-2 header; however, token-ring switches may decode the MAC address as well as the Routing Information Field (RIF) in the layer-2 header. The switch learns MAC addresses and keeps internal tables that map MAC addresses to switch ports. The specialized hardware finds the destination MAC address of incoming packets in its table and switches it to the correct outbound port at wire speed, based on the entry in the internal mapping table. This is the fast path in the switch.

This invention requires that some of the traffic in the switch be redirected to the switch CPU and analyzed for subnet specific information. The switch CPU then learns subnet information from these packets and makes selective forwarding decisions based on what has been learned. To eliminate impact on network throughput, the switch CPU should be fast enough to do the packet analysis and subnet learning quickly. This should not be a problem because only a small fraction of the traffic will be channelled to the switch CPU while the majority of traffic will continue to be switched at full wire speed. Specifically, the switch CPU must perform the following tasks:

a. become aware of the subnets needed in the network;
    b. analyze certain layer-2 multicast packets for subnetting information;
    c. selectively forward certain layer-2 multicast packets.

Each of these steps is now examined in more detail. The term "user" in this context refers to a network or system administrator.

Becoming aware of the subnets needed in the network can be accomplished by allowing the user to specify the subnets and subnet masks to the switch via a user interface provided by the switch. The subnets being defined are the subnets inside the larger IP network or IP subnet. The subnet mask that needs to be defined is the mask for the subnet which would normally be the mask that was previously being defined in the hosts. The IP subnet mask in the hosts is now set to a smaller value as explained above. Referring to FIG. 3, the masks for the subnets 32, 34 are set to 255.255.255.0. The subnet masks for hosts 36, 38 are set to the smaller value 255.255.0.0.

Figure 4:
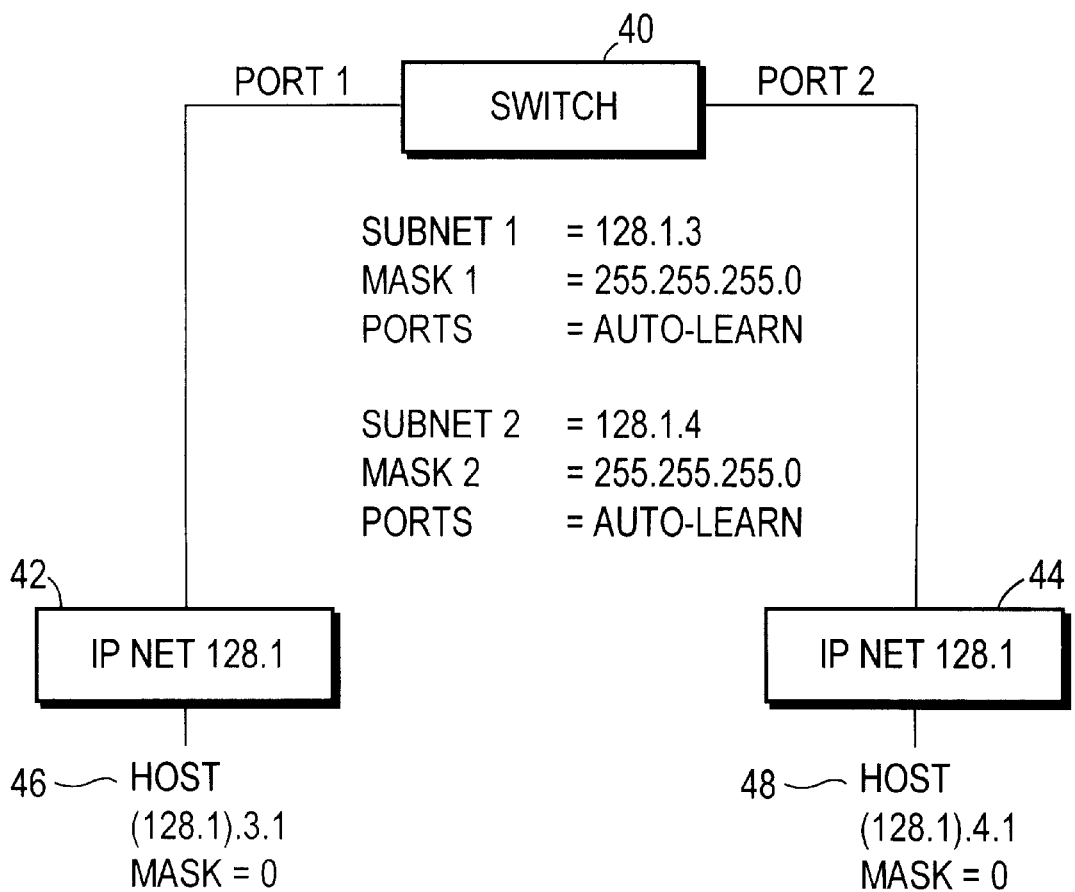
FIG. 4 illustrates an example of how IP subnets and subnet masks are defined at a switch.

The user would normally define all the subnets and masks to the switch as shown in FIG. 4. For controlled environments, a user could statically assign subnets to specific switch ports. This is how IP routers are normally configured. However, if flexibility is desired, the user could let the switch dynamically learn (auto-learn) subnet to switch port mapping as further indicated in FIG. 4. This will allow the hosts such as 46 or 48 to move around the network without a need for changing any host configuration as is required in router-based networks today. An option could also be provided to exclude ports from a subnet for security reasons.

It becomes necessary to statically assign the subnets for those ports whose attached hosts are all silent, i.e., those hosts that do not generally send packets. This is required because the switch relies on network traffic to auto-learn. An example of a silent station is a network printer. When multiple switches are connected together to form a larger switched network, configuration must be done for each switch. The same issue exists for current users configuring multiple routers. One common way to solve this issue is to use existing protocols like Boot Protocol (BOOTP) and Trivial File Transfer Protocol (TFTP) to remotely download configurations from a central server where configurations can be maintained. When multiple switches are connected together to make a larger switched network, then special configuration must be done in the switch to allow auto-learning to span multiple switches. The switch then saves this configuration information in its permanent memory. This information is used during packet analysis as explained below.

One significant benefit of implementing subnetting within the switches is that network administrators can have much better control of the subnets. For example, if network administrators want to increase the total number of subnets, they currently have to get every host on the network to change the subnet mask. Furthermore, these changes have to be synchronized at the subnet level to occur at the same time. This can be a very difficult task for large networks. With this invention, network administrators can simply change the subnet mask at the switches without involving end users. Controlling the subnets at the switch also eliminates the connectivity problems that users frequently experience if they define the subnet mask in their hosts incorrectly.

This invention does not have to be implemented in every switch in the network. It can coexist with other switches that do not have this capability and can therefore be phased into the network. Making the switch CPU aware of subnets needed in the network can be automated. What is minimally required from the user is the length of the subnet mask. The switch can dynamically learn the subnets. This would allow plug and play capability. However, network administrators generally like to control their subnets.

Figure 5:
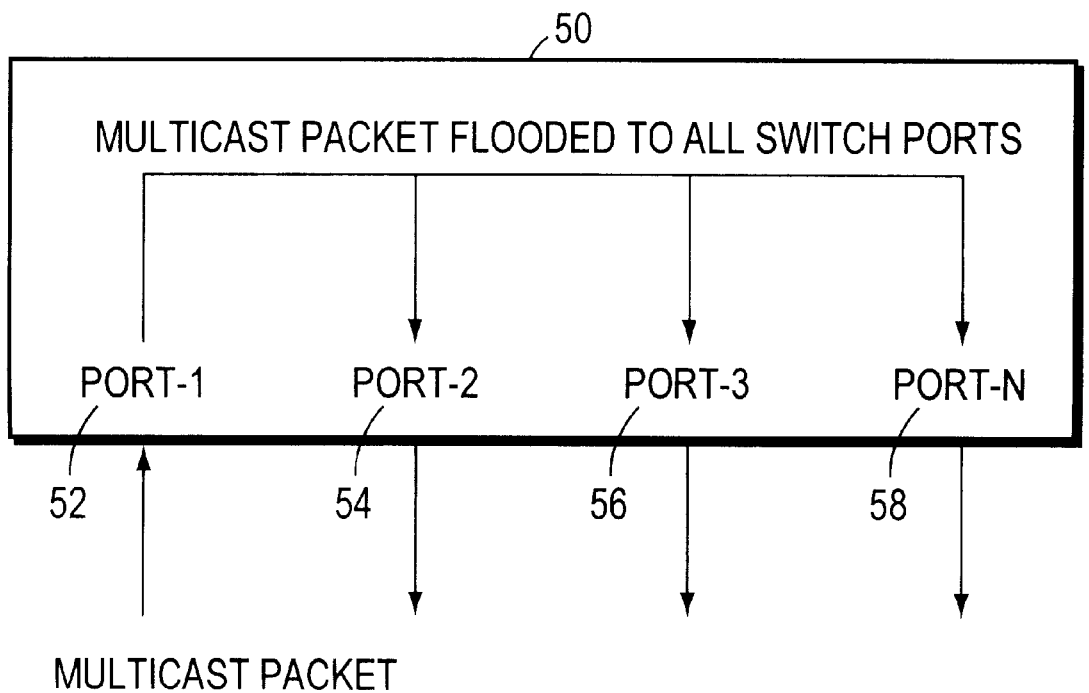
FIG. 5 illustrates a prior art example of the processing of multicast packets in a switch.
Figure 6:
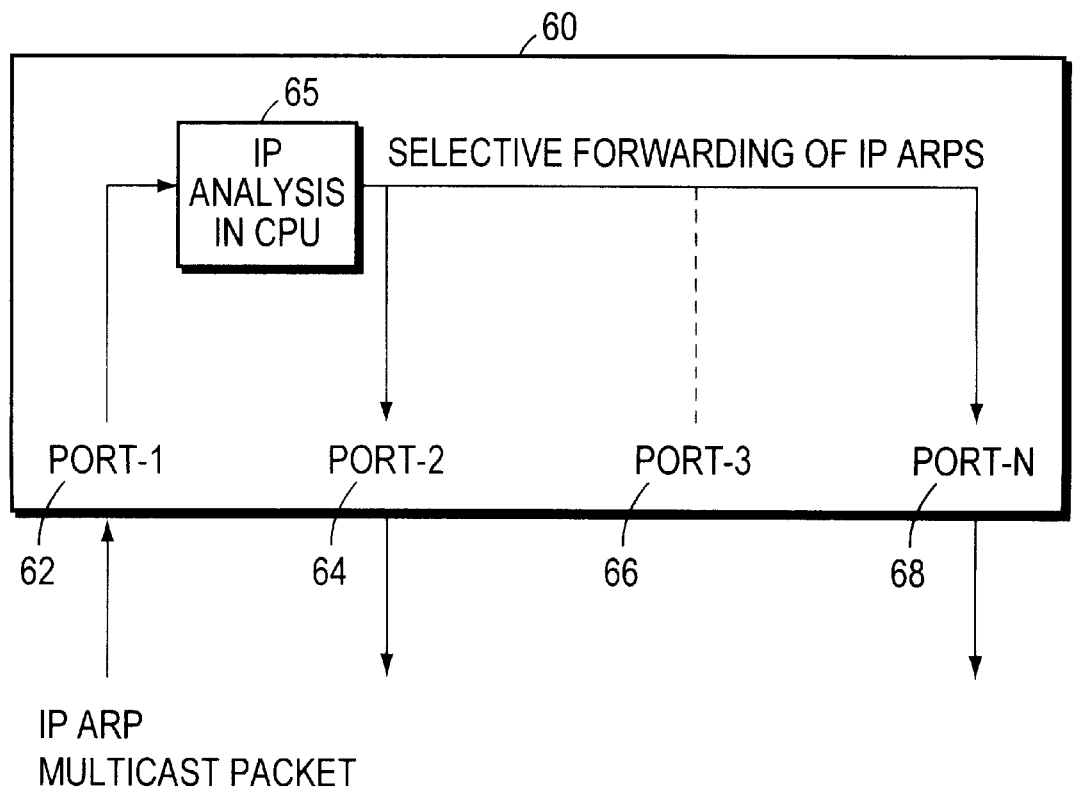
FIG. 6 illustrates an example of the selective processing of multicast packets in an IP aware switch of the present invention.

The switch CPU must analyze certain layer-2 multicast packets for subnetting information. Normally multicast packets are propagated by the switch hardware to all switch ports as illustrated in FIG. 5. In the figure, a multicast packet coming into switch 50 on port-1 52 is flooded to port-2 54, port-3 56 and port-n 58. One possible implementation is to set the switch internal MAC tables to forward the layer-2 all stations multicast address to the switch CPU for layer-3 analysis. This MAC address in hexadecimal notation is FF FF FF FF FF FF. For token-ring switches, packets with destination layer-2 address FF FF FF FF FF FF as well as those packets with destination layer-2 address CO OO FF FF FF FF must be forwarded to the switch CPU. The CPU can then analyze the packet and selectively forward it to a subset of switch ports based on layer-3 information like destination subnet as illustrated in FIG. 6. As shown in the figure, an IP ARP multicast packet coming into switch 60 on port-1 62 is forwarded to switch CPU 65 which selectively forwards the IP ARP to port-2 64 and to port-n 68.

Generally, this analysis can be done for any layer-3 protocol, but this invention specifically addresses the special processing required for the IP protocol. A description of the IP layer-3 analysis follows:

1. The switch CPU must look beyond the layer-2 MAC header and decode the higher layer (i.e., layer-3) header in the packet and determine if the packet is an IP ARP (Address Resolution Protocol) packet. The decoding of the packet varies based on the type of layer-2 network and the frame format used by the sender. For example, FIG. 7 illustrates an Ethernet packet carrying an IP ARP packet in DIX format. The Ethertype field value of hexadecimal 0806 in the layer-2 header and the protocol field value of hexadecimal 0800 in the layer-3 header indicates that the packet is an IP ARP packet.

2. If the packet is an IP ARP packet, the switch CPU must analyze the ARP packet header and get both the source and destination IP addresses.

Figure 8A:
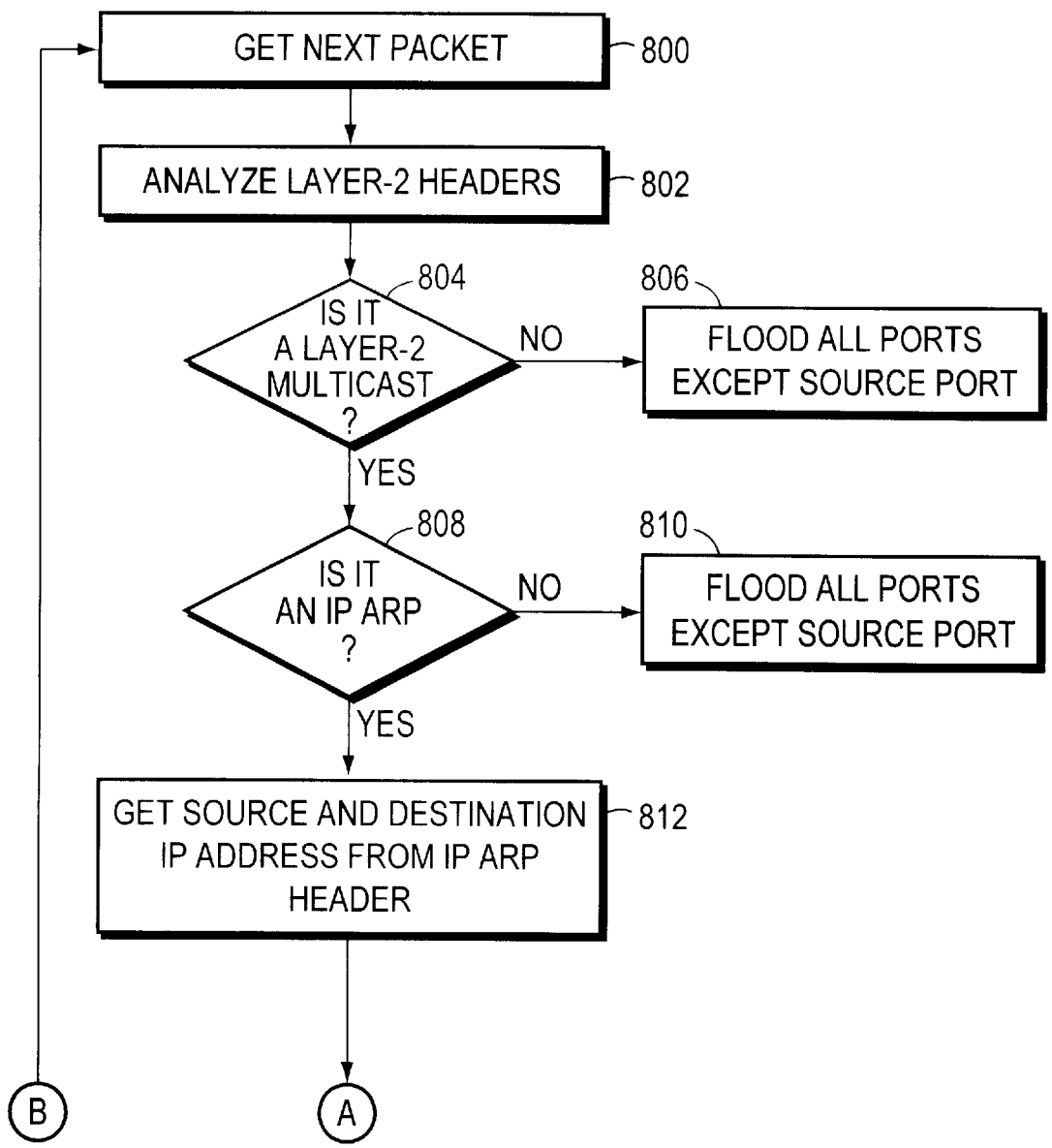
FIGS. 8A–8B illustrate the logic steps performed by the switch analysis and forwarding algorithm of the present invention.
Figure 8B:
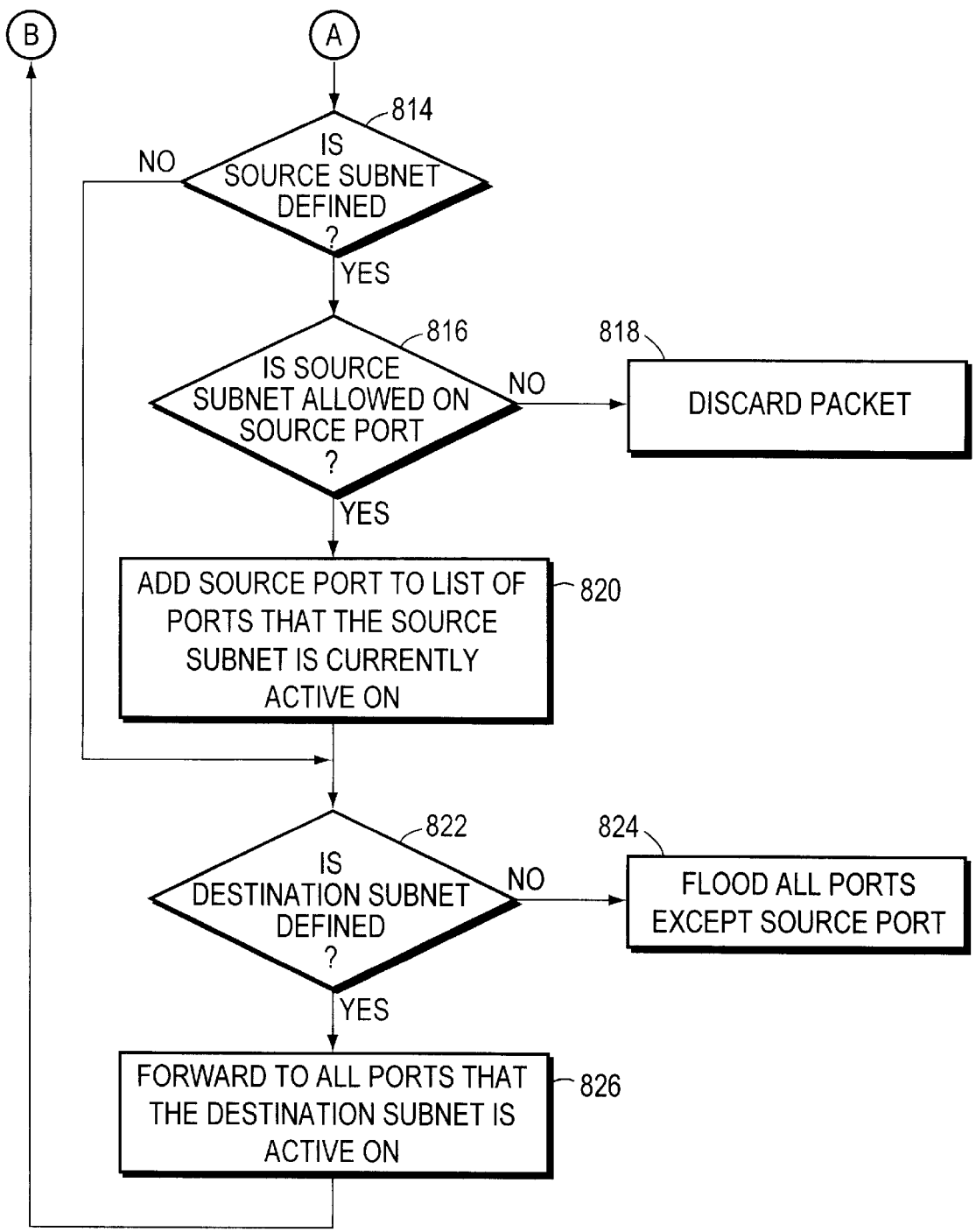

The CPU uses the logic depicted in FIGS. 8A–8B to learn subnets and to selectively forward multicast packets. In step 800, the switch CPU receives a packet for analysis. The switch CPU logic analyzes the layer-2 header in the packet in step 802. In decision step 804, a determination is made as to whether or not the packet is a layer-2 multicast packet (i.e., destination MAC address FF FF FF FF FF FF or CO OO FF FF FF FF). If it is not, then the switch CPU floods all ports except the source port as indicated in step 806. If it is a multicast packet, then in decision step 808, a determination is made as to whether the packet is an IP ARP packet. If it is not, then the switch CPU floods all ports except the source port as indicated in step 810. Otherwise, the switch CPU logic gets the source and destination IP address from the IP ARP packet header in step 812.

Next, in decision step 814, a test is made to determine if a source subnet is defined in a internal subnet to port mapping table by the switch CPU. If the source subnet is not defined, then processing proceeds to decision step 822. If the source subnet is defined, then in decision step 816, a test is made to determine if the source subnet is allowed on the source port. If it is not, then the packet is discarded in step 818. If the source subnet is allowed on the source port, the switch CPU logic, in step 820, adds the source port to the list of ports on which the source subnet is active as indicated in the subnet to port mapping table.

The final stage of processing in FIGS. 8A–8B tests for destination subnet. In decision step 822, a test is performed to determine if the destination subnet is defined in the internal subnet to port mapping table. If the destination subnet is not defined, all ports are flooded except for the source port in step 824. Otherwise switch CPU logic forwards the packet to all ports on which the destination subnet is active as indicated in the subnet to port mapping table.

In larger networks multiple layer-2 switches will be interconnected. This creates a problem for auto-learning. Since the ports that interconnect switches will probably not have end-host generating packets, the switch CPU will not auto-learn subnets on these ports and therefore will not propagate IP ARPs on these ports. This means that switches will not auto-learn the subnets on other switches. Therefore, if multiple switches are interconnected and auto-learning is needed, all subnets should be statically assigned to ports that connect to other switches. This would also allow the user to assign a subset of subnets to these ports and therefore control which subnets can span each switch. Alternatively, the user can simply identify the switch ports that connect to other switches and the switch CPU could automatically assign all subnets to these ports. Another possibility is to use an existing protocol like Routing Information Protocol (RIP) to let switches advertise the subnets they have discovered. A protocol like this would reduce unnecessary inter-switch broadcast propagation.

Figure 9:
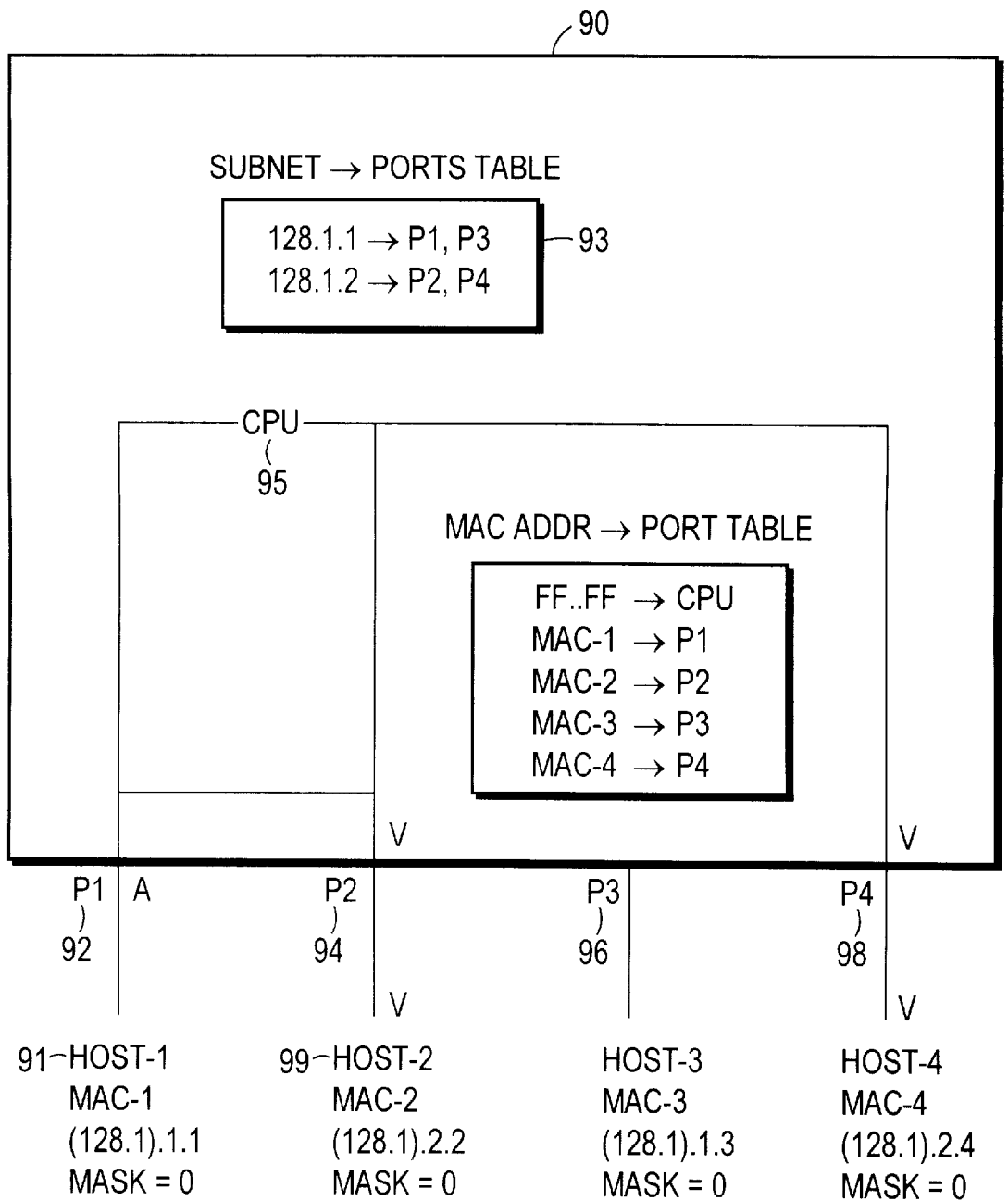
FIG. 9 illustrates examples of the slow and fast path flows within the IP aware switch of the present invention.

In the example shown in FIG. 9, host-1, designated by reference numeral 91, has MAC address mac-1, IP address 128.1.1.1, mask set to 0 (natural net is 128.1) and is attached to port p1 designated by reference numeral 92, of switch 90. Host-1 is trying to communicate with host-2, designated by reference numeral 99, and sends an IP ARP to find the MAC address of host-2. The IP ARP flows from host-1 through the slow path including switch CPU 95. Since the IP ARP is a layer-2 broadcast, the destination MAC address is FF FF FF FF FF FF. The switch layer-2 internal mapping table 97 is set to forward packets with destination MAC address FF FF FF FF FF FF to the switch CPU 95. The switch CPU 95 analyzes the packet as described in FIGS. 8A–8B and forwards it to a selected set of ports p2, p4 (reference numerals 94, 98 respectively) based on the state information as maintained in the mapping table 93 with subnet to ports mapping. Host-2 99 responds to the IP ARP request with an IP ARP reply. Subsequent IP packets from host-1 to host-2 are addressed to the MAC address of host-2, i.e., mac-2. These packets flow through the fast path from p1 to p2 due to the MAC address to port mapping table 97 maintained by the switch.

The algorithm depicted in FIGS. 8A–8B and described above for selectively forwarding certain layer-2 multicast packets does not control layer-3 IP broadcasts. IP broadcast packets will be flooded to all ports of the switch. One way to control layer-3 broadcasts is to forward them with traditional routers and filter them in the layer-2 switches..

While the invention has been particularly shown and described with reference to the particular embodiments thereof, it will be understood by those skilled in the art that obvious changes in form and details may be made therein without departing from the spirit and scope of the invention.

Having thus described our invention, what we claim and desire to secure as letter patent is as follows:

What is claimed is:

1. A switch for providing a data link layer switching function between distinct subnetworks of a data communications system having a plurality of interconnected subnetworks for enabling end stations on the distinct subnetworks to communicate directly without the use of router devices, the switch comprising:

a subnet mask and a plurality of subnets specified by a user via a user interface, the subnet mask being larger in value than a subnet mask of a source end station on a first distinct subnetwork, said source end station having a network layer address, and a data link layer address, the subnet mask of the switch also being larger in value than a subnet mask of a destination end station on a second distinct subnetwork, said destination end station having a network layer address, and a data link address;

packet analysis and forwarding programming code, operating on a processing unit in said switch, for analyzing a multicast packet, having both network layer information and a medium access control (MAC) address, received from said source end station, and selectively forwarding said multicast packet to all ports associated with a destination subnet; and a subnet to port mapping table for storing a mapping of said plurality of subnets to a plurality of ports associated with each said subnet;

the packet analysis and programming code also analyzing the MAC address of the multicast packet to make a determination of whether the packet is an all stations multicast message, and if the code determines that the multicast packet is an all stations multicast message, the code then analyzes the network layer information to determine whether the multicast packet is an address resolution protocol packet, and if the code determines that the multicast packet is an address resolution protocol packet, the code then makes a forwarding decision for the multicast packet based upon subnet information derived from the network layer information.

2. A switch according to claim 1, further comprising a data link layer address to port mapping table for storing a mapping of data link layer addresses to ports based on address information in a reply packet received from said destination end station in response to said forwarded multicast packet.

3. A switch according to claim 2, wherein the switch conveys packets from said source end station to said destination end station using said data link layer address to port mapping table.

4. A switch according to claim 1, wherein said subnet to port mapping table is built by said packet analysis and forwarding programming code by logically combining said switch subnet mask with the source network layer address in each multicast packet received from a source end station attached to one of said switch ports to determine the subnet corresponding to said source end station.

5. A switch according to claim 1, wherein said plurality of subnetworks communicate using the Internet Protocol (IP).

6. A switch according to claim 1, wherein said data link layer addresses of said source end station and said destination end station are media access control (MAC) addresses.

7. A switch according to claim 1, wherein said distinct subnetworks are each Ethernet local area networks.

8. A switch according to claim 1, wherein said distinct subnetworks are each token ring networks.

9. A switch according to claim 1, wherein each multicast packet received is automatically forwarded to said switch processing unit for packet analysis and forwarding.

10. A method implemented by a switch for enabling source and destination end stations to communicate directly, without the use of router devices, in a data communication system having a plurality of interconnected subnetworks, the switch providing a data link layer switching function between a source end station on a first subnetwork and a destination end station on a second subnetwork, the method comprising:

specifying in the switch a plurality of subnets for said data communication system and a subnet mask, the subnet mask being larger in value than a subnet mask specified at the source end station, the subnet mask in the switch also being larger in value than a subnet mask specified in the destination end station;

determining each port of the switch associated with each of said plurality of subnets in said data communication system;

analyzing at the switch a multicast packet, having both network layer information and a Medium Access Control (MAC) address, received from said source end station to determine the ports associated with a destination subnet; and selectively forwarding at the switch said multicast packet to said ports associated with said destination subnet;

analysis of the multicast packet including determining whether the MAC address indicates that the multicast packet is an all stations multicast message, and if the multicast packet is an all stations multicast message, the method also includes analyzing the network layer information to determine whether the multicast packet is an address resolution protocol packet, and if the multicast packet is an address resolution protocol packet, a forwarding decision is made for the multicast packet based upon subnet information derived from the network layer information.

11. A method according to claim 10, further comprising building a subnet to port mapping table in the switch which maps said plurality of subnets to a plurality of ports associated with each said subnet.

12. A method according to claim 10, wherein said determining each port step includes logically combining said switch subnet mask with a source network layer address in each multicast packet received from said source end station attached to one of said switch ports to determine the subnet corresponding to said source end station.

13. A method according to claim 10, further comprising building a data link layer address to port mapping table in said switch which maps data link layer addresses to ports based on address information in a reply packet received from said destination end station in response to said forwarded multicast packet.

14. A method according to claim 10, wherein said plurality of subnetworks are local area networks with said source end station communicating with said destination end station using the Internet Protocol (IP).

15. A method according to claim 10, wherein said analyzing and selectively forwarding steps are performed by packet analysis and forwarding code operating on a processing unit in said switch.

16. A switch for providing a data link layer switching function in a communication system having a plurality of interconnected subnetworks, the system including a source end station on a first subnetwork and a destination end station on a second subnetwork, the switch comprising:

means for specifying a plurality of subnets for said data communication system and a subnet mask in said switch, the subnet mask being larger in value than a subnet mask specified in the source end station;

means for determining each port associated with each of said plurality of subnets in said data communication system;

means for analyzing a multicast packet, having both network layer information and a medium access control (MAC) address, received from said source end station to determine the ports associated with a destination subnet; and means for selectively forwarding said multicast packet to said ports associated with said destination subnet;

the means for analyzing including means for determining if the multicast packet is an all stations multicast message, and means for analyzing the network layer information to determine whether the multicast packet is an address resolution protocol packet, and means for making a forwarding decision, if the multicast packet is an address resolution protocol packet, for the multicast packet based upon subnet information derived from the network layer information.

17. A switch according to claim 16, further comprising means for building a subnet to port mapping table in said switch which maps said plurality of subnets to a plurality of ports associated with each said subnet.

18. A switch according to claim 16, wherein said means for determining each port steps includes means for logically combining said switch subnet mask with a source network layer address in each multicast packet received from said source end station attached to one of said switch ports to determine the subnet corresponding to said source end station.

19. A switch according to claim 16, further comprising means for building a data link layer address to port mapping table in said switch which maps data link layer addresses to ports based on address information in a reply packet received from said destination end station in response to said forwarded multicast packet.

20. A switch according to claim 16, further comprising means for automatically forwarding each multicast packet from said source end station to a processing unit in said switch for packet analysis and forwarding.

* * * * *